(12) United States Patent
Grimm

(10) Patent No.: US 11,820,925 B2
(45) Date of Patent: Nov. 21, 2023

(54) FRICTIONAL CONNECTION OF COMPONENTS AND PROCESS FOR MAKING A FRICTIONAL CONNECTION

(71) Applicant: 3M INNOVATIVE PROPERTIES COMPANY, St. Paul, MN (US)

(72) Inventor: Florian T. Grimm, Kempten (DE)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 270 days.

(21) Appl. No.: 17/253,495

(22) PCT Filed: Jun. 18, 2019

(86) PCT No.: PCT/IB2019/055122
§ 371 (c)(1),
(2) Date: Dec. 17, 2020

(87) PCT Pub. No.: WO2019/244048
PCT Pub. Date: Dec. 26, 2019

(65) Prior Publication Data
US 2021/0253908 A1    Aug. 19, 2021

(30) Foreign Application Priority Data

Jun. 19, 2018 (EP) .................................. 18178439

(51) Int. Cl.
*C09J 5/00* (2006.01)
*B32B 15/08* (2006.01)
(Continued)

(52) U.S. Cl.
CPC ............... *C09J 5/00* (2013.01); *B32B 7/12* (2013.01); *B32B 15/08* (2013.01); *B32B 15/14* (2013.01);
(Continued)

(58) Field of Classification Search
CPC . C09J 5/00; B32B 15/08; B32B 15/14; B32B 15/18; B32B 2250/03;
(Continued)

(56) References Cited

U.S. PATENT DOCUMENTS 3,691,140 A    9/1972  Silver
4,190,321 A    2/1980  Dorer
(Continued)

FOREIGN PATENT DOCUMENTS

DE    102005006937    8/2016
EP    1564418    8/2005
(Continued)

OTHER PUBLICATIONS

Extended EP Search Report for EP Application No. 18178439.8, dated Jan. 3, 2019, 2 pages.
(Continued)

*Primary Examiner* — Yan Lan
(74) *Attorney, Agent, or Firm* — Thomas M. Spielbauer

(57) ABSTRACT

The present disclosure relates to a frictional connection comprising a connecting element and two components, the two components being frictionally joined with the connecting element. The present disclosure further relates to a process for making said frictional connection.

11 Claims, 6 Drawing Sheets

(51) Int. Cl.
    *B32B 15/14*     (2006.01)
    *B32B 15/18*     (2006.01)
    *B32B 7/12*     (2006.01)
    *F16B 11/00*     (2006.01)

(52) U.S. Cl.
    CPC ............ B32B 15/18 (2013.01); F16B 11/006 (2013.01); *B32B 2250/03* (2013.01); *B32B 2250/40* (2013.01); *B32B 2255/06* (2013.01); *B32B 2255/10* (2013.01); *B32B 2255/26* (2013.01); *B32B 2307/538* (2013.01); *B32B 2307/714* (2013.01); *B32B 2605/00* (2013.01)

(58) Field of Classification Search
    CPC ............ B32B 2250/40; B32B 2255/06; B32B 2255/10; B32B 2255/26; B32B 2307/538; B32B 2307/714; B32B 2605/00; B32B 7/12; F16B 11/006
    See application file for complete search history.

(56) References Cited

U.S. PATENT DOCUMENTS

| | | |
|---|---|---|
| 5,296,547 A | 3/1994 | Nestegard |
| 5,393,787 A | 2/1995 | Nestegard |
| 6,347,905 B1 | 2/2002 | Lukschandel |
| 7,163,741 B2 | 1/2007 | Khandpur |
| 2003/0077115 A1 | 4/2003 | Bryde |
| 2011/0039119 A1 | 2/2011 | Berger |

FOREIGN PATENT DOCUMENTS

| | | |
|---|---|---|
| EP | 3339658 | 6/2018 |
| EP | 3584296 | 12/2019 |
| WO | WO 2015/082365 A1 | 6/2015 |
| WO | WO2015/082365 | * 11/2015 |
| WO | WO 2017-063761 | 4/2017 |
| WO | WO 2018-118899 | 6/2018 |

OTHER PUBLICATIONS

International Search Report for PCT International Application No. PCT/IB2019/055122, dated Dec. 6, 2019, 5 pages.

* cited by examiner

FRICTIONAL CONNECTION OF COMPONENTS AND PROCESS FOR MAKING A FRICTIONAL CONNECTION

CROSS REFERENCE TO RELATED APPLICATIONS

This application is a national stage filing under 35 U.S.C. 371 of PCT/IB2019/055122, filed Jun. 18, 2019, which claims the benefit of European Application No. 18178439.8, filed Jun. 19, 2018, the disclosure of which is incorporated by reference in their entirety herein.

TECHNICAL FIELD

The present disclosure relates to a friction-increasing connection of components to be joined.

BACKGROUND

Force-locked connections are frequently used in all areas of machine, plant and motor vehicle construction and energy generation for the transmission of forces or torques. The size of the force which can be respectively transmitted depends not only on the structural design but also primarily on the static friction value (coefficient of static friction) of the component surfaces connected to one another. Therefore, in the case of such force-locked connections, it is endeavored to provide friction-increasing measures that allow the greatest possible transverse forces and torques to be transmitted safely. Further, force-locked connections may also be referred to as non-positive connections or frictional connections.

It is known to use friction-increasing interlayers to increase the holding forces or increase the torques than can be transmitted in bolted and clamped connections. U.S. Pat. No. 6,347,905 B1 discloses a connecting element for the friction-increasing play-free reversible connection of components to be joined. The connecting element comprises a spring-elastic steel foil which bears on its surface particles of a defined size, which are fixed on the spring-elastic foil by means of a binder phase. The particles consist of a hard material, preferably of diamond, cubic boron nitride, aluminum oxide, silicon carbide or boron carbide. By using this separate connecting element, the coefficient of static friction can be increased in frictional connections.

For many bolted or clamped connections, the components to be joined need to be prevented from corrosion. This is particularly needed if vehicles or machines are used in corrosive environments, or if the bolted parts consist of different materials, for example carbon steel and aluminum, or if the parts to be joined are coated with paint. These connections need to be prevented from fretting or electro-chemical corrosion.

Furthermore, for many bolted or clamped connections, the connecting element, used for friction-increasing connection of two components to be joined, should be pre-assembled to one of the two components. By pre-assembling of the connecting element, the assembly of the friction-increasing connection is facilitated and it is ensured during assembly that the connecting element cannot be omitted. The pre-assembly also ensures that only a single connecting element is used for each frictional connection. A connecting element being pre-assembled to one of the two components to be frictionally joined can be transported, for example to the manufacturer finally assembling the frictional connection of the two components to be joined. Methods for pre-assembling a connecting element are disclosed in US 2003/077115 A1 and US 2011/0039119 A1. In US 2003/077115 A1, the connecting element displays a component surface lying outside the joining surfaces of the connecting element, the component surface being shaped in such a way that is displays an elastic or springy property which makes possible a reversible locking of the connecting element on one of the workpieces to be joined together. The production of these connecting elements is very costly, and in some applications there is not enough space to apply such a connecting element. In US 2011/0039119 A1, the connecting element is fixed on the metal workpiece securely for purposes of assembly and transportation by welding involving the formation of locally confined weld points. The welding process is very expensive, as a separate welding equipment is required for the pre-assembling of the connecting element.

Therefore, there is a need to further improve frictional connections of components with respect to corrosion resistance, and there is a need to further improve frictional connections of components with respect to pre-assembly solutions for connecting elements being reliable and easy to apply.

As used herein, the term "comprise" shall include also the terms "consist essentially of" and "consists of".

SUMMARY

In a first aspect, the present disclosure relates to a frictional connection comprising a connecting element and two components, the two components being frictionally joined with the connecting element, wherein the connecting element comprises a metal substrate having a first joining surface on one side of the substrate and a second joining surface on an opposite side of the substrate, wherein each joining surface comprises hard particles fixed on the metal substrate by a metallic binder layer, and wherein each of the two components has a component joining surface, and wherein at least one part of the component joining surface of at least one component comprises a polymeric material.

In another aspect, the present disclosure also relates to a process for making such a frictional connection, comprising
  providing a connecting element, wherein the connecting element comprises a metal substrate having a first joining surface on one side of the substrate and a second joining surface on an opposite side of the substrate, wherein each joining surface comprises hard particles fixed on the metal substrate by a metallic binder layer,
  providing two components each of them having a component joining surface,
  applying a polymeric material on at least one part of the component joining surface of at least one component, and
  pressing the hard particles of the joining surfaces of the connecting element into the component joining surfaces of the two components,
  thereby frictionally-coupling the two components with the connecting element.

For frictional connections according to the present disclosure, the coefficient of static friction can be increased. Surprisingly, the coefficient of static friction of frictional connections as disclosed herein can be increased despite the use of a polymeric material on the component joining surfaces of the components to be joined.

In some embodiments, the frictional connection according to the present disclosure is significantly less susceptible to corrosion than the frictional connection disclosed in U.S. Pat. No. 6,347,905 B1.

In some embodiments, the frictional connection according to the present disclosure is suitable for applications where electrochemical corrosion is a problem as well as fretting.

In some embodiments, the frictional connection according to the present disclosure can be made by pre-assembling a connecting element to a first component in a reliable and easy manner, before it is joined with the second component to be frictionally joined with the first component.

BRIEF DESCRIPTION OF THE DRAWINGS

The present disclosure is explained in more detail on the basis of the drawings, in which FIGS. 1A-1B, 2A-2B and 3A-3B schematically show a cross-sectional view of a frictional connection of the present disclosure.

DETAILED DESCRIPTION

Figure 1A:
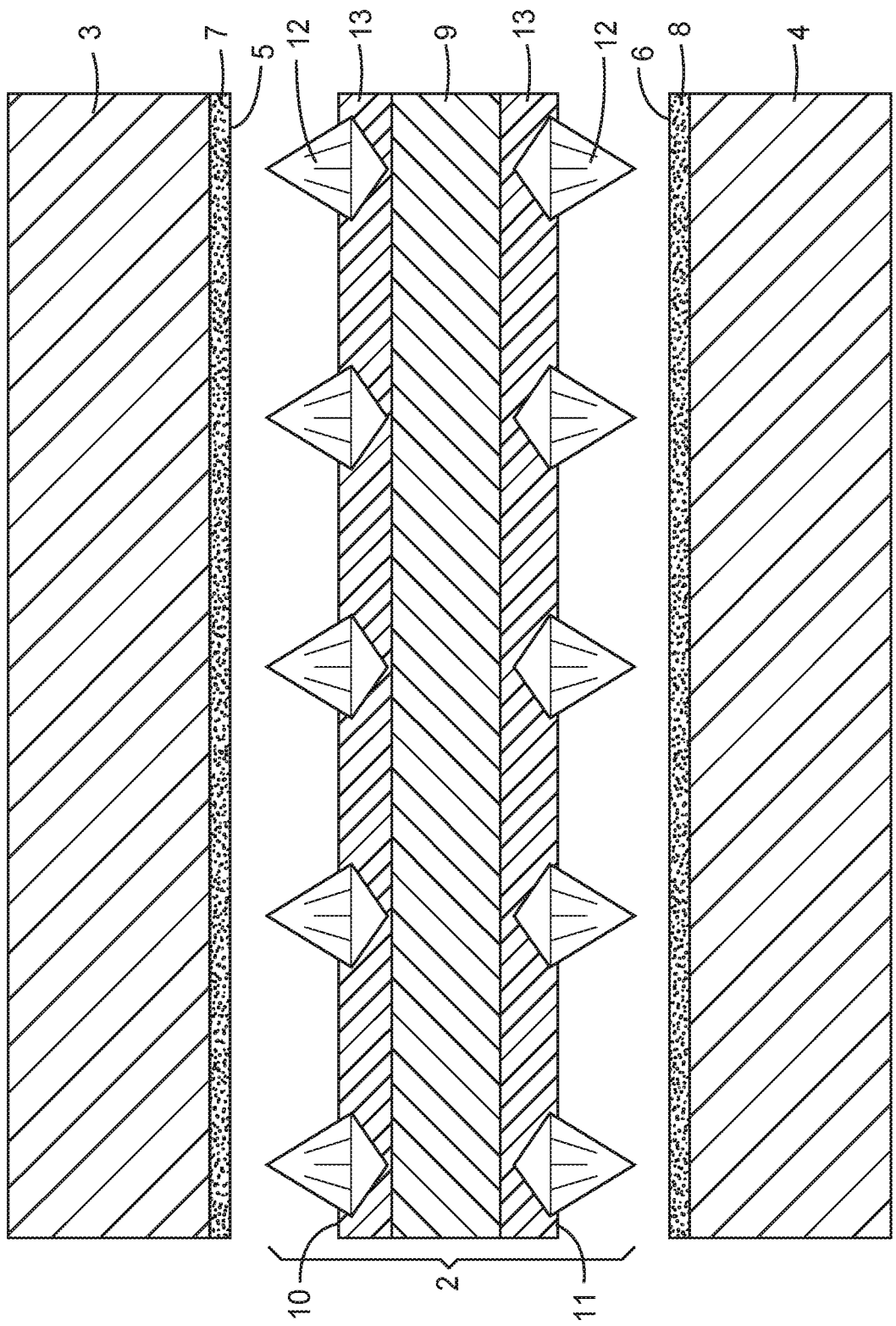

The hard particles of the connecting element preferably consist of a material which, under the particular conditions of use, does not react chemically either with the materials of the components to be joined or with environmental media. It is preferably an inorganic material.

Preferably, the hard particles are selected from the group consisting of carbides, nitrides, borides, silicon dioxide, aluminum oxide, diamond and mixtures thereof. Examples of carbides are silicon carbide, tungsten carbide and boron carbide, examples of nitrides are silicon nitride and cubic boron nitride. Preferably, diamonds are used as hard particles.

The size of the hard particles is selected in such a way that the damage to the joining surfaces caused by the particles being pressed into the surface does not reach an impermissible level. Preferably, this is ensured if the particle diameter is not greater than about three times the peak-to-valley height of the joining surfaces, which peak to valley results from machining of the joining surfaces. A mean particle size of 100 μm ($d_{50}$) or less generally fulfils this requirement. For example, hard particles with a mean particle size ($d_{50}$) of 10 μm, 25 μm, 35 μm, 55 μm or 75 μm can be used. In some embodiments, hard particles with a mean particle size ($d_{50}$) from 10 to 75 μm are used, or from 25 to 35 μm. The mean particle size can be measured by laser diffraction (Cilas, wet measurement).

The hard particles should have a narrow grain size range in which the scatter about a given nominal diameter amounts to no more than about +/−50%. In some embodiments, the scatter about a given nominal diameter should not amount to more than about +/−25%.

The number of hard particles per unit surface area of the joining surfaces of the connecting element may be selected in such a way that the normal force which is available for joining the components together is sufficient to ensure that the particles are pressed into the surface of the components to be joined. This will generally be the case if the area percentage of the joining surfaces of the connecting element which is covered with hard particles is from 3% to 60%. The area percentage of the joining surfaces of the connecting element which is covered with hard particles can be selected dependent on the mean particle size ($d_{50}$) of the hard particles. For example, for a mean particle size ($d_{50}$) of the hard particles of 10 μm from about 8% to 20% of the joining surfaces of the connecting element may be covered with hard particles, for a mean particle size ($d_{50}$) of 25 μm the area percentage may be from about 8% to 25%, and for a mean particle size ($d_{50}$) of 35 μm, the area percentage may be from about 10% to 30%.

The thickness of the metal substrate is selected depending on the application. In some embodiments, the thickness of the metal substrate is up to 2.0 mm. In other embodiments, the thickness is up to 1.0 or up to 0.5 mm. In some other embodiments, the thickness is up to 0.2 mm, in some other embodiments, the thickness is up to 0.1 mm. For large connecting elements that need to have higher strength and stiffness, for example connecting elements used for parts of wind turbines, the thickness of the metal substrate can be up to 0.5 mm or up to 1.0 mm or up to 2.0 mm. For applications that require a thin connecting element, for example if the design of the components to be joined should not be changed, the thickness of the metal substrate can be 0.2 mm or less, or 0.1 mm or less, preferably 0.1 mm.

The metal substrate may be made from steel, for example from unalloyed steel. Also high-alloy steel or stainless steel can be used. Examples for unalloyed steel are grade C75S-1.1248 according to DIN EN 10132-4 or grade C60S-1.1211 according to DIN EN 10132-4.

The metallic binder layer may comprise nickel.

The thickness of the metallic binder layer may be from 5 to 70 μm, specifically from 10 to 70 μm, more specifically from 10 to 50 μm.

In some embodiments, the thickness of the metallic binder layer is not more than 60% of the mean particle size ($d_{50}$) of the hard particles. In some other embodiments, the thickness of the metallic binder layer is not more than 50% of the mean particle size ($d_{50}$) of the hard particles. In yet some other embodiments, the thickness of the metallic binder layer is not more than 20% of the mean particle size ($d_{50}$) of the hard particles. The thickness of the metallic binder layer may be at least 5 μm. The hard particles are protruding from the metallic binder layer. When the connecting element is in frictional engagement with the components to be joined, the hard particles are pressed into the surfaces of the components to be joined, therefore increasing the coefficient of friction of the connection.

The metal substrate of the connecting element has a first joining surface on one side of the substrate and a second joining surface on an opposite side of the substrate. Each joining surface comprises hard particles fixed on the metal substrate by the metallic binder layer.

The frictional connection disclosed herein comprises the connecting element and two components, the two components being frictionally joined with the connecting element. Each of the two components has a component joining surface. At least one part of the component joining surface of at least one component comprises a polymeric material. In some embodiments, only a part of the component joining surface of one of the two components comprises a polymeric material. In some embodiments, the complete component joining surface of one of the two components comprises a polymeric material. In some embodiments, only a part of the component joining surface of one of the two components and the complete component joining surface of the other one of the two components comprise a polymeric material. In some embodiments, the complete component joining surface of both of the two components comprises a polymeric material.

In some embodiments, the polymeric material is an adhesive material. The adhesive property of the polymeric material is useful for pre-assembling the connecting element by gluing it to one of the two components to be joined. By gluing, the connecting element will have its correct position on one of the components to be joined and will keep this position during assembling of the second component to be joined.

In some embodiments, the polymeric material comprises at least one continuous layer.

In some embodiments, the polymeric material comprising at least one continuous layer is applied as a coating on at least one part of the component joining surface of at least one component. The polymeric material may be a deformable material. The polymeric material can be elastically deformable or plastically deformable or both. The polymeric material comprising at least one continuous layer can have corrosion protective properties.

By "at least one continuous layer" it is meant that one or two or three or more continuous layers may be applied.

The polymeric material comprising at least one continuous layer may be a thermoplastic polymer, a duroplastic polymer or an elastomeric polymer. For example, the polymeric material comprising at least one continuous layer can be selected from the group consisting of polyester materials, acrylic materials, epoxy materials, formaldehyde resins, polyurethane materials, polyvinylacetate (PVAC) materials, polyvinyl butyral (PVB) materials, polyvinyl chloride (PVC) materials, silicone materials, rubber materials and combinations thereof. In some embodiments, the polymeric material, such as the epoxy or acrylic or other materials, can have corrosion protective properties or adhesive properties or both corrosion protective and adhesive properties. An example for acrylic materials are polyacrylates, an example for polyurethane materials are thermoplastic polyurethane (TPU) materials, examples for rubber materials are styrene butadiene rubber, chloroprene rubber and isoprene rubber.

In some embodiments, the polymeric material comprising at least one continuous layer may be a lacquer on the basis of epoxy or acrylic resin coated by cathodic dip coating. The lacquer may be corrosion-protective.

The thickness of the at least one continuous layer of the polymeric material may be up to 300 μm and is usually from 1 to 300 μm. The thickness depends on the polymeric material, on the process of applying the polymeric material on the component joining surface, and the level of corrosion protection desired in a specific application. In some embodiments, for example for corrosion protective coatings made by cathodic dip coating, the thickness of the at least one continuous layer of the polymeric material may be from 1 to 100 μm, or from 15 to 50 μm, or from 10 to 30 μm.

If the polymeric material comprising at least one continuous layer is an adhesive material and the polymeric material does not need to increase the corrosion protective effect between the two components to be joined, then the thickness of the at least one continuous layer can be from 1 to 25 μm or lower than 10 μm, and typically is from 5 to 10 μm. The thickness of the at least one continuous layer needs to be thick enough to adhere at the connecting element during pre-assembling. This will generally be the case if the thickness of the coating layer is at least 1 μm.

In some embodiments, in a first step a first continuous layer of a polymeric material having corrosion protective properties and not having adhesive properties, is coated on at least one part of the component joining surface of at least one component, and in a second step, a second continuous layer of a polymeric material being an adhesive material is coated on the first continuous layer. This two-layer coating comprising two different polymeric materials can be useful if the adhesive material does not have corrosion protective properties. The sum of the thickness of the first and second continuous layer is from 1 to 300 μm, and the thickness of the second continuous layer can be from 1 to 25 μm or lower than 10 μm, and typically is from 5 to 10 μm.

In some embodiments, the thickness of the at least one continuous layer of the polymeric material may be less than the height of the hard particles protruding from the metallic binder layer of the connecting element. In some embodiments, the thickness of the at least one continuous layer may be equal to the height of the hard particles protruding from the metallic binder layer of the connecting element. In some embodiments, the thickness of the at least one continuous layer may be higher than the height of the hard particles protruding from the metallic binder layer of the connecting element.

The height of the hard particles protruding from the metallic binder layer can be calculated by subtracting the height of the metallic binder layer from the mean particle size ($d_{50}$) of the hard particles.

The hardness of the at least one continuous layer of the polymeric material may be measured according to DIN EN ISO 15184:2012 and may be at least 3H.

In some embodiments, the polymeric material is a pressure sensitive adhesive material. The adhesive property is useful for pre-assembling the connecting element by gluing it to one of the two components to be joined. By gluing, the connecting element will have its correct position on one of the components to be joined and will keep this position during assembling of the second component to be joined.

The pressure sensitive adhesive material may comprise at least one continuous layer. The at least one continuous layer of a pressure sensitive adhesive may be applied only on a part of the component joining surface of one or both of the components to be joined. The at least one continuous layer of a pressure sensitive adhesive may be applied on the complete surface of the component joining surface of one or both of the components to be joined. The pressure sensitive adhesive material comprising at least one continuous layer on at least one part of at least one of the component joining surfaces of the components to be joined may be applied onto the component joining surfaces in the form of an adhesive film or a tape.

In some embodiments, the pressure sensitive adhesive material comprising at least one continuous layer consists of a single layer of a pressure sensitive adhesive which may be applied onto the component joining surfaces in the form of an adhesive film. The adhesive film may comprise a release liner which is removed before assembling the components to be joined with the connecting element. The release liner may be made of a plastic film such as polypropylene, polyethylene, polyvinyl chloride, polyester (e.g., polyethylene terephthalate), cellulose acetate and ethyl cellulose.

In some embodiments, the pressure sensitive adhesive material comprising at least one continuous layer comprises a first layer of a first pressure sensitive adhesive and a second layer of a second pressure sensitive adhesive. A carrier layer is positioned between the first and the second layer. The first and the second pressure sensitive adhesive may be of a different pressure sensitive adhesive material, or may be of the same pressure sensitive adhesive material. The carrier layer is bearing the first pressure sensitive adhesive and the second pressure sensitive adhesive. The carrier layer may be made of a plastic film such as polyolefin (e.g., polypropylene, polyethylene), polyvinyl chloride, polyester (e.g., polyethylene terephthalate), polyamide, cellulose acetate and ethyl cellulose. The first layer of a first pressure sensitive adhesive and the second layer of a second pressure sensitive adhesive may be applied onto the component joining surfaces of the components to be joined in the form of a double-sided tape. The double-sided tape may comprise a release liner which is removed before assembling the components to be joined with the connecting element. The release liner may be made of a plastic film such as polypropylene, polyethylene, polyvinyl chloride, polyester (e.g., polyethylene terephthalate), cellulose acetate and ethyl cellulose.

The pressure sensitive adhesive material comprising at least one continuous layer is selected from the group consisting of rubber-based pressure sensitive adhesives, acrylic-based pressure sensitive adhesives and silicone-based pressure sensitive adhesives.

The pressure sensitive adhesive material comprising at least one continuous layer may comprise a crosslinking additive. The crosslinking additive may be selected from the group of multifunctional (meth)acrylate compounds. The pressure sensitive adhesive may be crosslinked thermally or with actinic radiation, more in particular with e-beam or UV irradiation.

The rubber-based pressure sensitive adhesives may be natural rubber-based adhesives or synthetic rubber-based adhesives. Synthetic rubber-based pressure sensitive adhesives may be based on, for example, polyisoprene, polybutadiene, styrene-isoprene-styrene copolymer (SIS), styrene-butadiene-styrene copolymer (SBS), and butyl rubber. Also thermoplastic block copolymer adhesives, polyolefin based pressure sensitive adhesives such as ethylene propylene diene monomer (EPDM) rubber and polyisobutylene (PIB), and olefin block co-polymer based pressure sensitive adhesives such as INFUSE™ olefin block copolymers commercially available from Dow may be used.

In some embodiments of the present disclosure, the polymeric material is a pressure sensitive adhesive comprising a rubber-based elastomeric material, at least one hydrocarbon tackifier and optionally a crosslinking additive. The optional crosslinking additive may be selected from the group of mulitifunctional (meth)acrylate compounds.

In some embodiments, the polymeric material is a rubber-based pressure sensitive adhesive and comprises:
a) a multi-arm block copolymer of the formula $Q_n$-Y, wherein:
  (i) Q represents an arm of the multi-arm block copolymer and each arm independently has the formula G-R,
  (ii) n represents the number of arms and is a whole number of at least 3, and
  (iii) Y is the residue of a multifunctional coupling agent,
  wherein each R is a rubbery block comprising a polymerized conjugated diene, a hydrogenated derivative of a polymerized conjugated diene, or combinations thereof, and each G is a glassy block comprising a polymerized monovinyl aromatic monomer; and
b) at least one hydrocarbon tackifier which is primarily compatible with the rubbery blocks.

In some embodiments, the polymeric material is a rubber-based pressure sensitive adhesive and comprises:
a) a multi-arm block copolymer of the formula $Q_n$-Y, wherein:
  (i) Q represents an arm of the multi-arm block copolymer and each arm independently has the formula G-R,
  (ii) n represents the number of arms and is a whole number of at least 3, and
  (iii) Y is the residue of a multifunctional coupling agent,
  wherein each R is a rubbery block comprising a polymerized conjugated diene, a hydrogenated derivative of a polymerized conjugated diene, or combinations thereof, and each G is a glassy block comprising a polymerized monovinyl aromatic monomer;
b) optionally, a plasticizer having a weight average molecular weight $M_w$ comprised between 500 and 100.000 g/mol;
c) at least one hydrocarbon tackifier which is primarily compatible with the rubbery blocks;
d) a glassy block compatible aromatic resin having a softening point value (RBSP) of at least 150° C., when measured by the ring and ball test method; and
e) optionally, a linear block copolymer of the formula $L-(G)_m$, wherein L is a rubbery block comprising a polymerized olefin, a polymerized conjugated diene, a hydrogenated derivative of a polymerized conjugated diene, or any combinations thereof; and wherein m is 1 or 2.

The multi-arm block copolymer is such that n ranges from 3 to 10.

Suitable rubbery blocks R for use in the rubber-based pressure sensitive adhesive described above comprise polymerized conjugated dienes, hydrogenated derivatives of a polymerized conjugated diene, or combinations thereof. Specifically, the rubbery block of at least one arm may comprise a polymerized conjugated diene selected from the group consisting of isoprene, butadiene, ethylene butadiene copolymers, hydrogenated derivatives of polyisoprene or polybutadiene, and combinations or mixtures thereof. Advantageously, the rubbery blocks of each arm may comprise a polymerized conjugated diene selected from the group consisting of isoprene, butadiene, ethylene butadiene copolymers, hydrogenated derivatives of polyisoprene or polybutadiene, and any combinations or mixtures thereof. Preferably, at least one of the rubbery blocks of the multi-arm block copolymer comprises a conjugated diene selected from the group consisting of isoprene, butadiene, and any combinations thereof. More preferably, each of the rubbery blocks of the multi-arm block copolymer comprises a conjugated diene selected from the group consisting of isoprene, butadiene, and any combinations or mixtures thereof.

At least one arm of the multi-arm block copolymer may be selected from the group consisting of styrene-isoprene-styrene, styrene-butadiene-styrene, styrene-ethylene-butadiene-styrene, styrene-ethylene-propylene-styrene, and combinations thereof. Preferably, each arm of the multi-arm block copolymer is selected from the group consisting of styrene-isoprene-styrene, styrene-butadiene-styrene, styrene-ethylene-butadiene-styrene, styrene-ethylene-propylene-styrene, and any combinations thereof.

The glassy block of at least one arm of the multi-arm block copolymer may comprise a monovinyl aromatic monomer selected from the group consisting of styrene, styrene-compatible blends, and any combinations thereof. Advantageously, the glassy blocks of each arm comprise a monovinyl aromatic monomer selected from the group consisting of styrene, styrene-compatible blends, and any combinations thereof.

Multi-arm block copolymers for use in the rubber-based pressure sensitive adhesive described above are disclosed e.g. in U.S. Pat. No. 7,163,741 B1 (Khandpur et al.). Methods of making multi-arm block copolymers are described in, e.g., U.S. Pat. No. 5,296,547 (Nestegard et al.), or in U.S. Pat. No. 5,393,787 (Nestegard et al.).

The rubber-based pressure sensitive adhesive comprising the multi-arm block copolymer may comprise from 20 wt % to 80 wt %, from 20 wt % to 70 wt %, from 25 wt % to 60 wt %, from 30 wt % to 60 wt %, or even from 35 wt % to 60 wt % of the multi-arm block copolymer of the formula $Q_n$-Y, based on the weight of the pressure sensitive adhesive. The pressure sensitive adhesive may comprise from 20 wt % to 70 wt %, from 25 wt % to 60 wt %, or even from 25 wt % to 50 wt % of the hydrocarbon tackifier, based on the weight of the pressure sensitive adhesive. The pressure sensitive adhesive may further comprise from 0.5 to 35 wt %, from 1 to 30 wt %, from 2 to 25 wt %, or even from 5 to 25 wt % of the glassy block compatible aromatic resin, based on the weight of the pressure sensitive adhesive. The pressure sensitive adhesive optionally may further comprise from 2 wt % to 20 wt %, from 4 wt % to 15 wt %, from 5 wt % to 12 wt %, or even from 5 wt % to 10 wt % of the plasticizer, based on the weight of the pressure sensitive adhesive. The pressure sensitive adhesive optionally may further comprise from 20 wt % to 80 wt %, from 20 wt % to 70 wt %, from 25 wt % to 60 wt %, from 30 wt % to 60 wt %, or even from 35 wt % to 60 wt % of the linear block copolymer.

As the hydrocarbon tackifier which is primarily compatible with the rubbery blocks, either solid or liquid hydrocarbon tackifiers may be added, solid hydrocarbon tackifiers being preferred. A tackifier is "compatible" with a block if it is miscible with that block. Suitable tackifying resins may include terpene resins such as polyterpenes (e.g., alpha pinene-based resins, beta pinene-based resins, and limonene-based resins) and aromatic-modified polyterpene resins (e.g., phenol modified polyterpene resins); and petroleum-based hydrocarbon resins such as C5-based hydrocarbon resins, C9-based hydrocarbon resins, C5/C9-based hydrocarbon resins, and dicyclopentadiene-based resins. Combinations of various tackifiers can be used if desired. Tackifiers derived from C5 monomers are referred to as C5-based hydrocarbon resins while those derived from C9 monomers are referred to as C9-based hydrocarbon resins.

The C5-based hydrocarbon resins are commercially available from Eastman Chemical Company under the trade designations PICCOTAC and EASTOTAC, from Cray Valley under the trade designation WINGTACK, from Neville Chemical Company under the trade designation NEVTAC LX, and from Kolon Industries, Inc. under the trade designation HIKOREZ. The C5-based hydrocarbon resins are commercially available from Eastman Chemical with various degrees of hydrogenation under the trade designation EASTOTACK.

The C9-based hydrocarbon resins are commercially available from Eastman Chemical Company under the trade designation PICCO, KRISTALEX, PLASTOLYN, and PICCOTAC, and ENDEX, from Cray Valley under the trade designations NORSOLENE, from Ruetgers N.V. under the trade designation NOVAREZ, and from Kolon Industries, Inc. under the trade designation HIKOTAC. These resins can be partially or fully hydrogenated. Prior to hydrogenation, the C9-based hydrocarbon resins are often about 40 percent aromatic as measured by proton Nuclear Magnetic Resonance. Hydrogenated C9-based hydrocarbon resins are commercially available, for example, from Eastman Chemical under the trade designations REGALITE and REGALREZ that are 50 to 100 percent (e.g., 50 percent, 70 percent, 90 percent, and 100 percent) hydrogenated. The partially hydrogenated resins typically have some aromatic rings.

Various C5/C9-based hydrocarbon tackifiers are commercially available from Arakawa under the trade designation ARKON, from Zeon under the trade designation QUINTONE, from Exxon Mobil Chemical under the trade designation ESCOREZ, and from Newport Industries under the trade designations NURES and H-REZ (Newport Industries). In the context of the present disclosure, suitable hydrocarbon tackifiers for use herein may be advantageously selected among those C5/C9-based hydrocarbon tackifiers commercially available from Exxon Mobil Chemical under the trade designation ESCOREZ.

Exemplary hydrocarbon tackifiers that are primarily compatible with the rubbery blocks are advantageously selected from the group consisting of aliphatic hydrocarbon resins, cycloaliphatic hydrocarbon resins, aromatic modified aliphatic and cycloaliphatic resins, hydrogenated hydrocarbon resins, terpene and modified terpene resins, terpene-phenol resins, rosin esters, and any combinations or mixtures thereof.

Advantageous hydrocarbon tackifiers which are primarily compatible with the rubbery blocks are selected from the group consisting of polymeric terpenes, hetero-functional terpenes, rosin acids, esters of rosin acids, disproportionated rosin acid esters, hydrogenated, C5 aliphatic resins, C9 hydrogenated aromatic resins, C5/C9 aliphatic/aromatic resins, dicyclopentadiene resins, hydrogenated hydrocarbon resins arising from C5/C9 and dicyclopentadiene precursors, hydrogenated styrene monomer resins, and any blends thereof.

The expression "glassy block compatible aromatic resin" is meant to refer to an aromatic resin which is compatible with the glassy blocks. An aromatic resin is "compatible" with the glassy blocks if it is miscible with the glassy blocks. The softening point value (RBSP) of the glassy block compatible aromatic resin can be determined by the ring and ball test method according to ASTM E28-14.

The glassy block compatible aromatic resin may have a weight average molecular weight $M_w$ of 30.000 g/mol or less, of 25.000 g/mol or less, of 20.000 g/mol or less, of 15.000 g/mol or less, or even of 10.000 g/mol or less.

The glassy block compatible aromatic resin may have a softening point value (RBSP) of at least 150° C., at least 155° C., at least 160° C., at least 165° C., at least 170° C., at least 180° C., at least 190° C. or even at least 200° C., as determined by the ring and ball test method according to ASTM E28-14.

The glassy block compatible aromatic resin may have a glass transition temperature ($T_g$) of at least 100° C., at least 110° C., at least 120° C., at least 130° C., at least 140° C., at least 150° C., or even at least 160° C.

The glassy block compatible aromatic resin may be selected from the group consisting of hydrocarbon aromatic resins, arylene oxide resins, C9-based hydrocarbon aromatic resins, C9-based hydrogenated hydrocarbon aromatic resins, polyarylene oxide resins, in particular polyphenylene oxides or polyphenylene ethers, indene coumarone resins, aromatic resins based on copolymers of C9 with maleic anhydride, and any combinations or mixtures thereof.

The plasticizer may have a weight average molecular weight $M_w$ comprised between 500 and 100.000 g/mol, between 500 and 80.000 g/mol, between 500 and 70.000 g/mol, between 500 and 65.000 g/mol, between 500 and 60.000 g/mol, between 500 and 60.000 g/mol, or even between 500 and 55.000 g/mol.

The plasticizer may be selected from the group consisting of mineral oils, paraffinic oils, naphthenic oils, liquid hydrocarbon resins, liquid polyterpene resins, polyisobutylenes, polyisoprenes, polybutadienes, amorphous polyolefins and copolymers thereof, silicones, polyacrylates, oligomeric polyurethanes, ethylene propylene copolymers, any combinations or mixtures thereof.

The addition of a linear block copolymer to the rubber-based pressure sensitive adhesive as described above may advantageously impact the processability of the (co)polymeric precursor of the pressure sensitive adhesive due to the viscosity lowering effect of this compound. Also, the presence of a linear block copolymer as described above may additionally provide the resulting pressure sensitive adhesive with an improved tack performance.

The rubber-based pressure sensitive adhesive may be non-crosslinked, in particular not crosslinked with actinic radiation, more in particular with e-beam or UV irradiation. The rubber-based pressure sensitive adhesive may be free of any crosslinking additive.

The rubber-based pressure sensitive adhesive may comprise a crosslinking additive. The crosslinking additive may be selected from the group of multifunctional (meth)acrylate compounds. The rubber-based pressure sensitive adhesive may be crosslinked thermally or with actinic radiation, more in particular with e-beam or UV irradiation.

The pressure sensitive adhesive may be a hot melt adhesive.

The rubber-based pressure sensitive adhesive as described above can be manufactured by a method which comprises the step of compounding the multi-arm block copolymer, the at least one hydrocarbon tackifier which is primarily compatible with the rubbery blocks, optionally the glassy block compatible aromatic resin, further optionally the plasticizer, and further optionally, a linear block copolymer. The method may be a solvent-free method. In a particular aspect, the method of manufacturing the pressure sensitive adhesive may comprise a hotmelt processing step, preferably a continuous hotmelt mixing processing step, more preferably a hotmelt extrusion processing step, in particular a twin screw hotmelt extrusion processing step.

The rubber-based pressure sensitive adhesive as described above may also be manufactured by a solvent-based method. The solvent-based method may comprise the steps of
 a) dissolving the multi-arm block copolymer, the at least one hydrocarbon tackifier which is primarily compatible with the rubbery blocks, optionally the glassy block compatible aromatic resin, optionally the plasticizer, and further optionally, a linear block copolymer, in an organic solvent, thereby forming a solution of a pressure sensitive adhesive; and
 b) removing the organic solvent.

The rubber-based pressure sensitive adhesive may then be coated/applied upon a variety of substrates (e.g., release liner, tape backing, or carrier materials for double-sided adhesive tapes) to produce adhesive-coated articles such as films or tapes. The liner or backing or carrier can be formed of a polymeric material. Suitable polymeric liner or backing or carrier materials include, but are not limited to, polymeric films such as those prepared from polypropylene, polyethylene, polyvinyl chloride, polyester (polyethylene terephthalate (PET) or polyethylene naphthalate), polycarbonate, polymethyl(meth)acrylate (PMMA), cellulose acetate, cellulose triacetate, ethyl cellulose, and polyurethane.

The rubber-based pressure sensitive adhesive may be coated/applied on a substrate (e.g., release liner, tape backing, carrier for double-sided adhesive tapes) using any conventional coating techniques modified as appropriate to the particular substrate. For example, pressure sensitive adhesives may be applied/coated to a variety of solid substrates by methods such as roller coating, flow coating, dip coating, spin coating, spray coating knife coating, and die coating.

In some embodiments of the present disclosure, the polymeric material is an acrylic-based pressure sensitive adhesive.

The acrylic-based pressure sensitive adhesives may be solvent based acrylics, waterborne acrylics, hotmelt acrylics and UV cured acrylics.

In some embodiments of the present disclosure, the polymeric material is an acrylic-based pressure sensitive adhesive and comprises:
 a) at least one copolymer comprising:
  i) an acrylic or methacrylic acid ester of a non-tertiary alcohol, and
  ii) pendant styrenic polymeric moieties; and
 b) a polyarylene oxide polymer.

The acrylic acid ester may be formed from an alcohol having from 1 to 14 carbon atoms. The acrylic acid ester may be isooctyl acrylate or 2-ethylhexyl acrylate. The acrylic acid ester may be copolymerized with a polar monomer to form a polymeric backbone having styrenic polymeric moieties pendant from the polymeric backbone; the polar monomer may be selected from the group consisting of acrylic acid, methacrylic acid, itaconic acid, acrylamide, methacrylamide, acrylonitrile, and methacrylonitrile. The pendant styrenic polymeric moieties may have a molecular weight in the range of about 2,000 to about 30,000. The pendant styrenic polymeric moieties may comprise from 1 to 30 weight percent of the total weight of said copolymer. The pendant styrenic polymeric moieties may be formed from polymers selected from the group consisting of styrene, alpha-methyl styrene, 3-methylstyrene, vinyl toluene, ehtylstyrene, t-butylstyrene, isopropylstyrene, dimethylstyrene, vinylnaphtalenes, and mixtures thereof.

The copolymer of said acrylic-based pressure sensitive adhesive may comprise copolymerized A and B monomers, wherein:
 a) A is a monomeric acrylic or methacrylic acid ester of a non-tertiary alcohol, said alcohol having from about 1 to about 14 carbon atoms, and
 b) B is a monomer having the general formula X—(Y)$_n$—Z wherein:
  X is a vinyl group copolymerizable with said A monomer;
  Y is a divalent linking group; where n can be zero or 1;
  Z is a monovalent styrenic polymeric moiety having a molecular weight in the range of about 2,000 to 30,000 and being essentially unreactive under copolymerization conditions.

The polyarylene oxide polymer of said acrylic-based pressure sensitive adhesive may comprise polyphenylene ether or poly(2,6-dimethyl-1,4-phenylene ether). The polyarylene oxide polymer may have a glass transition temperature of at least 100° C. The acrylic-based pressure sensitive adhesive may further comprise a tackifier.

Said acrylic-based pressure-sensitive adhesive may be made by a solvent-free method comprising:
 a) providing a polymeric composition containing
  i) at least one copolymer comprising:
   1) an acrylic or methacrylic acid ester of a non-tertiary alcohol, and
   2) pendant styrenic polymeric moieties; and
  ii) a polyarylene oxide polymer;

b) heating the polymeric composition to a temperature above its glass transition temperature without substantially degrading the polymeric components; and c) mixing the polymeric composition.

The polymeric composition of said acrylic-based pressure-sensitive adhesive may then be coated/applied upon a variety of substrates (e.g., release liner, tape backing, or carrier materials for double-sided adhesive tapes) to produce adhesive-coated articles such as films or tapes. The liner or backing or carrier can be formed of a polymeric material. Suitable polymeric liner or backing or carrier materials include, but are not limited to, polymeric films such as those prepared from polypropylene, polyethylene, polyvinyl chloride, polyester (polyethylene terephthalate (PET) or polyethylene naphthalate), polycarbonate, polymethyl(meth)acrylate (PMMA), cellulose acetate, cellulose triacetate, ethyl cellulose, and polyurethane.

The polymeric composition of said acrylic-based pressure-sensitive adhesive may be coated/applied on a substrate (e.g., release liner, tape backing, carrier for double-sided adhesive tapes) using any conventional coating techniques modified as appropriate to the particular substrate. For example, pressure sensitive adhesives may be applied/coated to a variety of solid substrates by methods such as roller coating, flow coating, dip coating, spin coating, spray coating knife coating, and die coating.

The thickness of the at least one continuous layer of the pressure sensitive adhesive material may be from 1 to 300 µm. In some embodiments, the thickness of the at least one continuous layer of the pressure sensitive adhesive material may be from 1 to 25 µm or lower than 10 µm, and typically is from 3 to 10 µm. The thickness of the at least one continuous layer of the pressure sensitive adhesive material needs to be thick enough to adhere at the connecting element during pre-assembling. This will generally be the case if the thickness of the coating layer is at least 1 µm.

If the pressure sensitive adhesive material comprising at least one continuous layer comprises a first layer of a first pressure sensitive adhesive and a second layer of a second pressure sensitive adhesive and a carrier layer is positioned between the first and the second layer, the sum of thickness of the first and second layer and of the carrier layer may be from 1 µm to 25 µm. In some embodiments, the sum of thickness of the first and second layer and of the carrier layer is from 3 to 10 µm. The thickness of the first layer may be from 1 µm to 23 µm, the thickness of the second layer may be from 1 µm to 23 µm, and the thickness of the carrier layer may be at least 1 µm. In some embodiments, the thickness of the first layer may be from 1 µm to 10 µm or from 1 to 5 µm, the thickness of the second layer may be from 1 µm to 10 µm or from 1 to 5 µm, and the thickness of the carrier layer may be at least 1 µm.

Typically, the thickness of the at least one continuous layer of the pressure sensitive adhesive is less than the height of the hard particles protruding from the metallic binder layer. The thickness of the at least one continuous layer of the pressure sensitive adhesive can be as thin as possible while maintaining the adhesive properties. This will generally be the case if the thickness of the at least one continuous layer of the pressure sensitive adhesive is at least 1 µm.

In some embodiments, the polymeric material is a pressure sensitive adhesive material comprising a plurality of discontinuous islands.

The thickness of the discontinuous islands may be from 10 to 150 µm. More specifically, the thickness of the discontinuous islands may be from 10 to 100 µm, or from 10 to 50 µm. The islands may have a major axis length of from 10 to 500 µm. More specifically, the islands may have a major axis length of from 10 to 50 µm or from 10 to 20 µm, or from 20 to 50 µm, or from 20 to 100 µm, or from 30 to 50 µm, or from 50 to 100 µm, or from 20 to 500 µm, or from 20 to 200 µm. The islands may cover from 10% to 75% of at least one part of the component joining surface of at least one of the two components to be joined with the connecting element.

The pressure sensitive adhesive material comprising a plurality of discontinuous islands may be selected from the group consisting of rubber-based pressure sensitive adhesives, acrylic-based pressure sensitive adhesives and silicone-based pressure sensitive adhesives.

Suitable acrylic-based pressure sensitive adhesives are, for example, isoamylacrylate, N-butylacrylate, mixtures of N-butylacrylate and hydroxymethacrylate, copolymers of isooctyl acrylate and and acrylic acid, and mixtures of isooctylacrylate, acrylic acid, methyl methacrylate and styrene. Suitable rubber-based pressure sensitive adhesives are natural rubber-based and synthetic rubber-based. Suitable silicone-based pressure sensitive adhesives may comprise polymethyl diphenyl siloxane, or polymethyl siloxane.

In some embodiments of the polymeric material being a pressure sensitive adhesive material comprising a plurality of discontinuous islands, the pressure sensitive adhesive material is an acrylic-based pressure sensitive adhesive comprising a copolymer comprising 90 to 99.5 percent by weight of one or more oleophilic, water-emulsifiable alkyl acrylate esters and 0.5 to 10 percent by weight of one or more monomers selected from the group consisting of oil-insoluble, water-soluble, ionic monomers and maleic anhydride.

The copolymer is inherently tacky, elastomeric, and in the form of microspheres. The microspheres are insoluble in organic solvents, and form suspensions in all common solvents except highly polar solvents such as water, methanol, and ethanol. Typical useful solvents are ethyl acetate, tetrahydrofuran, heptane, 2-butanone and other ketones, benzene, cyclohexane, esters, isopropanol, and higher alcohols. The copolymer microspheres are small in size, having diameters in the range of about 1 to about 250 µm, the diameter of the majority of the spheres falling in the range of about 5 to about 150 µm. Solvent suspensions of these microspheres may be sprayed by conventional techniques or may be incorporated in aerosol containers with suitable propellants such as iso-butane or isobutylene. The tacky microspheres provide a pressure-sensitive adhesive which has a low degree of adhesion permitting separation, repositioning and rebonding of adhered objects. The tacky spheres resist permanent deformation, regaining their spherical shape upon release of pressure. The copolymer microspheres can be prepared by an aqueous suspension polymerization technique as described in U.S. Pat. No. 3,691,140.

The alkyl acrylate ester monomer portion of the copolymer microspheres may comprise one ester monomer or a mixture of two or more ester monomers. Similarly, the oil-insoluble, water-soluble monomer portion of the copolymer microspheres may comprise maleic anhydride alone, an ionic monomer alone, a mixture of two or more ionic monomers, or a mixture of maleic anhydride with one or more ionic monomers.

The alkyl acrylate ester monomer portion of these microspheres consist of those alkyl acrylate monomers which are oleophilic, water emulsifiable, of restricted water-solubility, and which, as homopolymers, generally have glass transition temperatures below about −20° C. Suitable alky acrylate ester monomers include iso-octyl acrylate, 4-methyl-2-pentyl acrylate, 2-methylbutyl acrylate, sec-butyl acrylate, and the like. Acrylate monomers with glass transition temperatures higher than −20° C. (i.e. tert-butyl acrylate, iso-bornyl acrylate or the like) may be used in conjunction with one of the above described acrylate ester monomers.

The water-insoluble ionic monomer portion of these microspheres is comprised of those monomers which are substantially insoluble in oil. By substantially oil-insoluble and water-soluble it is meant that the monomer has a solubility of less than 0.5% by weight and, a distribution ratio at a given temperature (preferably 50-65° C.), of solubility in the oil phase to solubility in the aqueous phase of less than about 0.005. Ionic monomers conforming to the preceding criteria include trimethylamine methacrylimide, trimethylamine p-vinyl benzimide, ammonium acrylate, sodium acrylate, N,N-dimethyl-N—(ß-methacryloxyethyl) ammonium propionate betaine, 1,1-dimethyl-1-(2-hydroxypropyl) amine methacrylimide, 4,4,9-trimethyl-4-azonia-7-oxo-8-oxa-9-decene-1-sulphonate, and 1,1-dimethyl-1-(2,3-dihydroxypropyl) amine methacrylimide.

The peel adhesion of the polymeric material being a pressure sensitive adhesive material comprising a plurality of discontinuous islands may be at least 8 g/cm width, measured as adhesion to polyester film. Usually the peel adhesion of the pressure sensitive adhesive comprising a plurality of discontinuous islands is not more than 80 g/cm width, measured as adhesion to polyester film, but it is also possible that the peel adhesion is above 80 g/cm width, measured as adhesion to polyester film. For measuring the peel adhesion, the adhesive to be tested can be first applied to a surface to which it will adhere tenaciously, e.g., anodized aluminum or alumina-surfaced biaxially oriented polyester film such as that described in U.S. Pat. No. 4,190,321. A 2.54 cm×2.54 cm strip of 25 micrometer biaxially oriented polyethylene terephthalate film is then applied to the adhesive surface and rolled down with two passes of a 2 kg roller. Using a tensile testing machine, the force required to pull the polyester strip from the adhesive surface at a 90° angle at a rate of 30.5 cm per minute is then determined. Peel adhesion tests can be run both immediately after sample preparation and after a specified delay that allows the adhesion bond to stabilize.

In some embodiments of the frictional connection disclosed herein, at least one part of at least one of the joining surfaces of the connecting element comprises a polymeric material. The polymeric material may be in the form of at least one continuous layer. The polymeric material may be an adhesive material. The polymeric material may be a pressure sensitive adhesive material. The polymeric material may be a pressure sensitive adhesive material comprising at least one continuous layer, and the polymeric material may also be a pressure sensitive adhesive material comprising a plurality of discontinuous islands. For example, the joining surfaces of the components to be joined may be provided with a polymer layer for corrosion protection, and one of the joining surfaces of the connecting element may be provided with an adhesive material for facilitating the pre-assembly of the connecting element to one of the components to be joined. In another example of the frictional connection disclosed herein, the component joining surface of one of the two components to be joined is provided with an adhesive material for facilitating the pre-assembly of the connecting element, and in addition the joining surfaces of the connecting element may be provided with a polymer coating for corrosion protection.

The material of each of the two components of the frictional connection may be a metallic material or a fiber reinforced polymer material. The metallic material may be steel, for example cast steel or engineering steel. For example, the two components may be made from cast iron materials such as GJS700 or GJS400 or from fine-grained structural steels such as S690QL. As an example, one of the two components may be made from GJS700 and the other one may be made from GJS700, or one of the two components may be made from GJS700 and the other one may be made from GJS400, or one of the two components may be made from GJS700 and the other one may be made from S690QL.

Various embodiments of the connecting element according to the present disclosure are shown in the drawings.

Figure 1B:
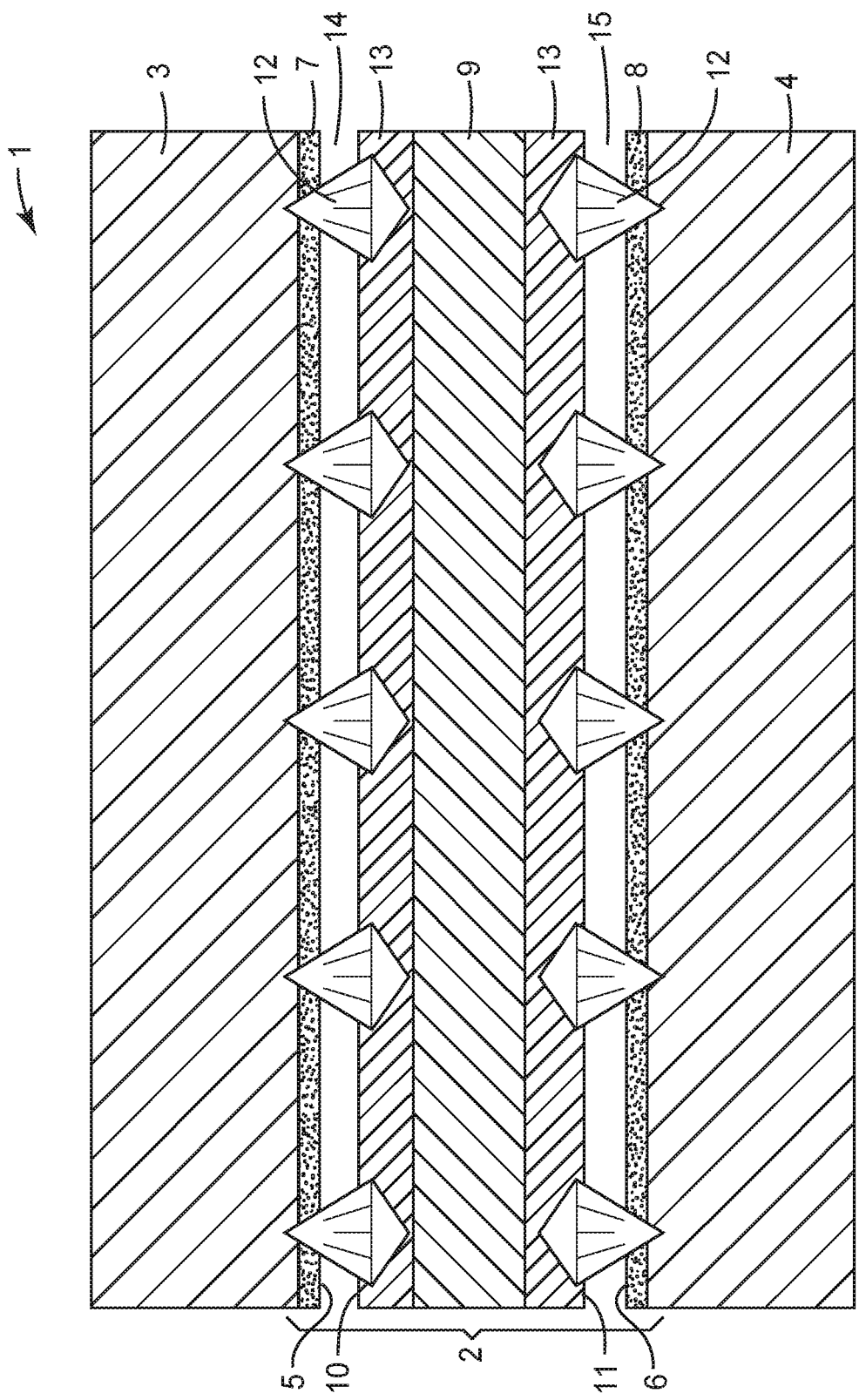

FIG. 1 B schematically shows the cross-sectional view of a first embodiment of a frictional connection of the present disclosure. The frictional connection 1 comprises a connecting element 2 and two components 3, 4, the two components 3, 4 being frictionally joined with the connecting element 2. FIG. 1 A schematically shows the connecting element 2 and the two components 3, 4 in the situation before the assembly of the frictional connection, i.e. before the two components 3, 4 have been frictionally joined with the connecting element 2. The component joining surfaces 5, 6 of each of the two components 3, 4 comprise a polymeric material in the form of a layer 7, 8, as can be seen from FIG. 1 A. The polymeric material may be applied as a coating on the two components 3, 4, for example by cathodic dip coating. The polymeric material may be for example a lacquer or other kind of coating for corrosion protection of the components 3, 4. The metal substrate 9 of the connecting element 2 has a first joining surface 10 on one side of the substrate 9 and a second joining surface 11 on an opposite side of the substrate 9. Each joining surface 10, 11 of the connecting element 2 comprises hard particles 12 which are fixed on the metal substrate 9 by a metallic binder layer 13. The thickness of the layer 7, 8 is lower than the height of the hard particles 12 protruding from the metallic binder layer 13.

In FIG. 1 B, the two components 3, 4 are frictionally joined with the connecting element 2. The curly bracket with reference number 2 for the connecting element is meant to include the hard particles 12, and does not include the layers 7, 8 and the two components 3, 4. As can be seen from FIG. 1 B, the hard particles 12 have been pressed into the component joining surfaces 5, 6 of the two components 3, 4, thereby frictionally-coupling the two components 3, 4 with the connecting element 2. The hard particles 12 have been pressed into the polymeric material in the form of a layer 7, 8, and into the bulk material of the two components 3, 4. An air gap 14, 15 has been left between the metallic binder layer 13 and the polymeric material in the form of a layer 7, 8. The coefficient of static friction is enhanced by the hard particles 12 being pressed into the polymeric material in the form of a layer 7, 8 and the components 3, 4 to be joined.

Figure 2A:
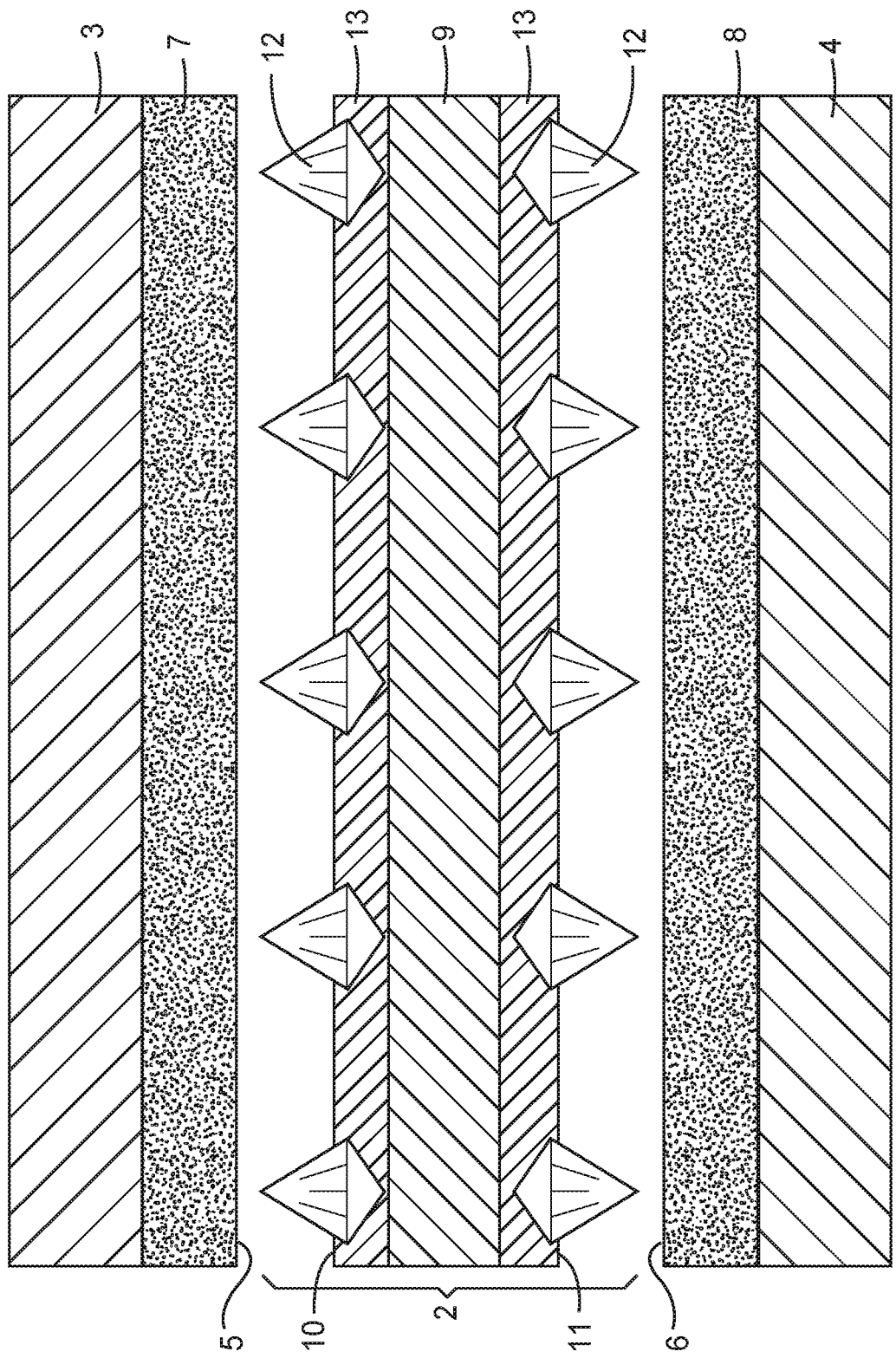
Figure 2B:
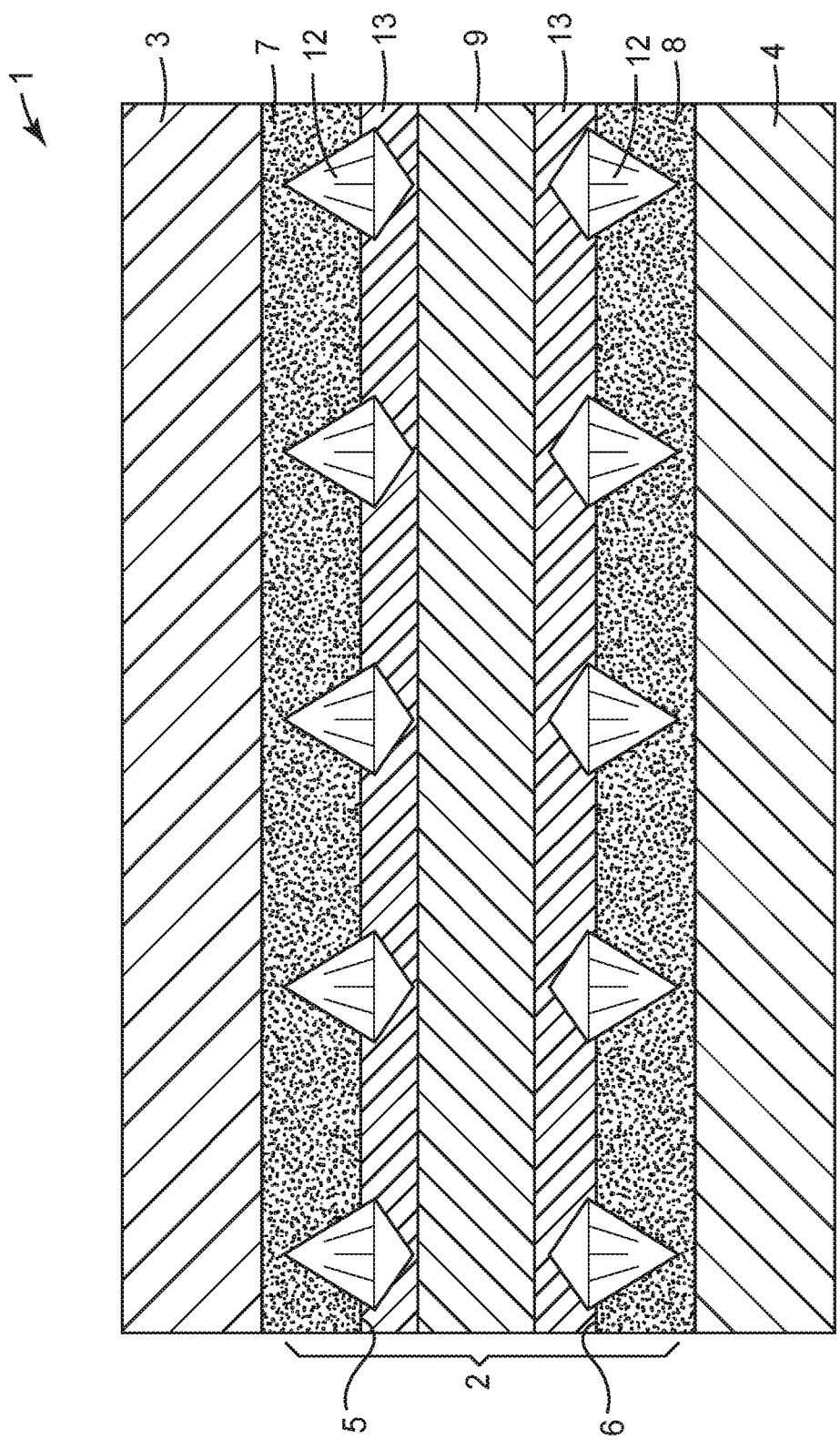

FIG. 2 B schematically shows the cross-sectional view of a second embodiment of a frictional connection of the present disclosure. The frictional connection 1 comprises a connecting element 2 and two components 3, 4, the two components 3, 4 being frictionally joined with the connecting element 2. FIG. 2 A schematically shows the connecting element 2 and the two components 3, 4 in the situation before the assembly of the frictional connection, i.e. before the two components 3, 4 have been frictionally joined with the connecting element 2. The component joining surfaces 5, 6 of each of the two components 3, 4 comprise a polymeric material in the form of a layer 7, 8, as can be seen from FIG. 2 A. The polymeric material may be applied as a coating on the two components 3, 4, for example by cathodic dip coating. The polymeric material may have sealing properties. The metal substrate 9 of the connecting element 2 has a first joining surface 10 on one side of the substrate 9 and a second joining surface 11 on an opposite side of the substrate 9. Each joining surface 10, 11 of the connecting element 2 comprises hard particles 12 which are fixed on the metal substrate 9 by a metallic binder layer 13. The thickness of the layer 7, 8 is higher than the height of the hard particles 12 protruding from the metallic binder layer 13.

In FIG. 2 B, the two components 3, 4 are frictionally joined with the connecting element 2. The curly bracket with reference number 2 for the connecting element is meant to include the hard particles 12, and does not include the layers 7, 8. As can be seen from FIG. 2 B, the hard particles 12 have been pressed into the component joining surfaces 5, 6 of the two components 3, 4, thereby frictionally-coupling the two components 3, 4 with the connecting element 2. The hard particles 12 have been pressed into the polymeric material in the form of a layer 7, 8. The hard particles 12 have not been pressed into the bulk material of the two components 3, 4. Between the metallic binder layer 13 and the polymeric material in the form of a layer 7, 8, no air gap has been left. The corrosion protective effect between two components 3, 4 to be joined is enhanced and the frictional connection 1 can be gas-tight. Also the coefficient of static friction is enhanced by the hard particles 12 being pressed into the layers 7, 8.

Figure 3A:
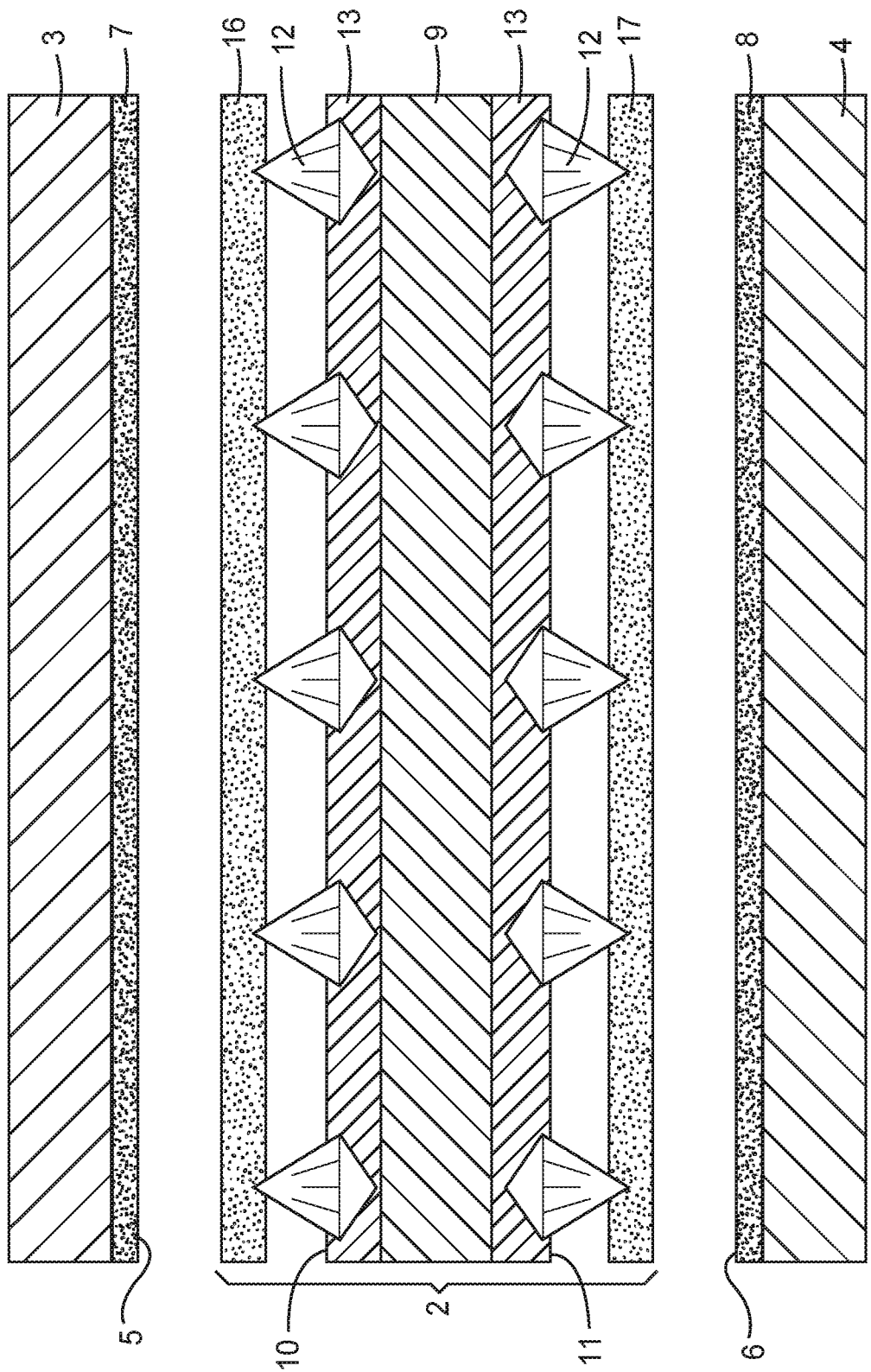
Figure 3B:
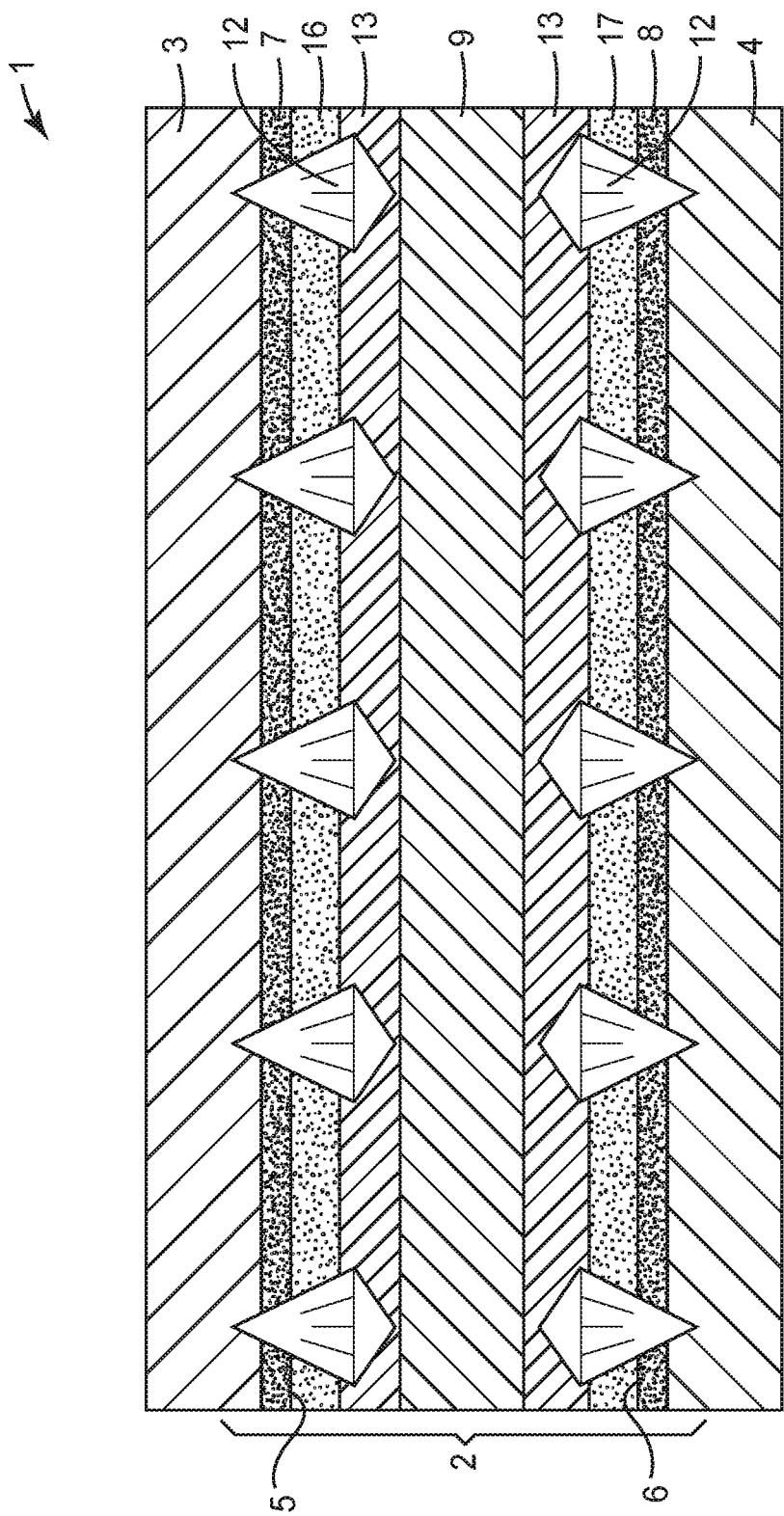

FIG. 3 B schematically shows the cross-sectional view of a third embodiment of a frictional connection of the present disclosure. The frictional connection 1 comprises a connecting element 2 and two components 3, 4, the two components 3, 4 being frictionally joined with the connecting element 2. FIG. 3 A schematically shows the connecting element 2 and the two components 3, 4 in the situation before the assembly of the frictional connection, i.e. before the two components 3, 4 have been frictionally joined with the connecting element 2. The component joining surfaces 5, 6 of each of the two components 3, 4 comprise a polymeric material in the form of a layer 7, 8, as can be seen from FIG. 3 A. The polymeric material may be applied as a coating on the two components 3, 4, for example by cathodic dip coating. The polymeric material may be for example a lacquer or other kind of coating for corrosion protection of the components 3, 4. The metal substrate 9 of the connecting element 2 has a first joining surface 10 on one side of the substrate 9 and a second joining surface 11 on an opposite side of the substrate 9. Each joining surface 10, 11 of the connecting element 2 comprises hard particles 12 which are fixed on the metal substrate 9 by a metallic binder layer 13. The thickness of the layer 7, 8 is lower than the height of the hard particles 12 protruding from the metallic binder layer 13. The connecting element comprises a pressure sensitive adhesive 16, 17 on the first joining surface 10 and on the second joining surface 11. The pressure sensitive adhesive 16, 17 is adhering to the hard particles 12. The pressure sensitive adhesive 16, 17 has been applied onto the hard particles in the form of a film. The thickness of the pressure sensitive adhesive 16, 17 is lower than the height of the hard particles 12 protruding from the metallic binder layer 13. The sum of the thickness of the layer 7, 8 and of the thickness of the pressure sensitive adhesive 16, 17 is also lower than the height of the hard particles 12 protruding from the metallic binder layer 13. By the pressure sensitive adhesive 16, 17, the connecting element 2 can be bonded and thus pre-assembled to the component joining surface 5, 6 of one of the two components 3, 4. For the assembly and for facilitating pre-assembly of the connecting element, it is sufficient to have a pressure sensitive adhesive on one of the two joining surfaces 10 or 11 of the connecting element 2, but it is also possible to have a pressure sensitive adhesive on both of the two joining surfaces 10, 11 of the connecting element 2, as shown in FIGS. 3 A and 3 B.

In FIG. 3 B, the two components 3, 4 are frictionally joined with the connecting element 2. The curly bracket with reference number 2 for the connecting element is meant to include the hard particles 12 and the pressure sensitive adhesive 16, 17, and does not include the layers 7, 8. As can be seen from FIG. 3 B, the hard particles 12 have been pressed through the pressure sensitive adhesive 16, 17 and into the component joining surfaces 5, 6 of the two components 3, 4, thereby frictionally-coupling the two components 3, 4 with the connecting element 2. The hard particles 12 have been pressed into the polymeric material in the form of a layer 7, 8, and into the bulk material of the two components 3, 4. Between the metallic binder layer 13 and the pressure sensitive adhesive 16, 17, as well as between the pressure sensitive adhesive 16, 17 and the polymeric material in the form of a layer 7, 8, no air gap has been left. The corrosion protective effect between two components 3, 4 to be joined is enhanced and the frictional connection 1 can even be gas-tight. Also the coefficient of static friction is enhanced by the hard particles 12 being pressed into the components 3, 4 to be joined.

The frictional connection disclosed herein can be made by a process comprising
  providing a connecting element, wherein the connecting element comprises a metal substrate having a first joining surface on one side of the substrate and a second joining surface on an opposite side of the substrate, wherein each joining surface comprises hard particles fixed on the metal substrate by a metallic binder layer,
  providing two components each of them having a component joining surface,
  applying a polymeric material on at least one part of the component joining surface of at least one component, and
  pressing the hard particles of the joining surfaces of the connecting element into the component joining surfaces of the two components,
  thereby frictionally-coupling the two components with the connecting element.

The metallic binder layer may be a nickel layer. The metallic binder layer may be produced by means of an electrodeposition process, for example by an external current-free (=chemical) electroplating process, also called electroless plating process, preferably by an electroless nickel plating process. The hard particles may be applied on the joining surfaces of the metal substrate by means of an electrodeposition process, for example by an electroless nickel plating process, using a chemical nickel bath with dispersed hard particles. Such electrodeposition and electroplating processes are customary in coating technology. The chemical nickel layer can be hardened by means of a heat treatment at up to about 400° C., with the result that the adhesion to the metal substrate is improved and the inherent hardness of the layer is increased. The hard particles are fixed on the metal substrate by means of the metallic binder layer.

For applying a polymeric material comprising at least one continuous layer on the component joining surface of the components to be joined, the polymeric material can be coated on the component joining surfaces.

For coating of the component joining surfaces, various methods can be applied. Suitable coating methods are, for example, cathodic dip coating, spray coating, screen printing, tampon printing and inkjet printing. For these coating methods, flowable coating formulations comprising solvents can be used. After applying the coating formulation on the part to be coated, the parts are dried in order to evaporate the solvent of the coating formulation. It is possible to bake the dried coatings, for example at temperatures of 120 to 180° C. By baking the coatings, a continuous and defect-free layer can be obtained.

By cathodic dip coating, also referred to as cathodic deposition painting, the component to be coated is dipped as cathode into a bath with a solution of a coating material. A coating is deposited on the component from the solution by direct current. The thickness of the layer of the coating material applied by cathodic dip painting can be, for example, 7 to 15 µm, 15 to 25 µm, 25 to 45 µm and more than 45 µm. After applying the layer of the coating material, the layer of the coating material is baked, for example at temperatures of 120 to 180° C. For example, aqueous solutions of epoxy and acryl can be used for cathodic dip coating.

By spray coating, the layer of the coating material is applied on the part to be coated in the form of a lacquer by means of a spray gun. The lacquer comprises particles to be coated and solvents. By suitably selecting spraying parameters such as spraying distance, spraying angle, spraying pressure and diameter of spray nozzles, the thickness of the layer of the coating material can be selected. After applying the lacquer, the solvent needs to be evaporated by drying the coating. It is possible to bake the spray-dried coatings, for example at temperatures of 120 to 180° C.

For screen printing, a flowable coating formulation is used which is passed through a sieve by means of a squeegee or doctor blade. The thickness of the layer of the coating material is selected by the sieve width. The smaller the mesh size of the sieve, the thinner will be the resulting layer of the coating material which is passed through the sieve.

By tampon printing, the layer of the coating material is applied on the part to be coated, i.e. on the connecting element not yet coated with a layer of the coating material, by means of a silicone roller, also referred to as "tampon". The tampon is wetted by a flowable coating formulation, and the wetted tampon is rolled over the part to be coated, thereby applying a layer of the coating material on the part to be coated.

By inkjet printing, the layer of the coating material is applied on the part to be coated by means of an inkjet printer. The coating material is used as an ink. After applying the coating material, the solvent needs to be evaporated by drying the coating. It is possible to bake the inkjet printed coatings, for example at temperatures of 120 to 180° C.

For applying a pressure sensitive adhesive material on the component joining surface of the components to be joined, the pressure sensitive adhesive can be used as a film, i.e. a continuous layer of pressure sensitive adhesive coated on a release liner such as a PET liner, or as a double-sided tape. The liner is removed before bonding the connecting element to the component to be joined. The double-sided tape may also comprise a release liner which is removed before bonding the connecting element to the component to be joined.

Typically, the pressure applied for pressing the continuous layer of a pressure sensitive adhesive onto the component joining surface of a component to be joined is at least 100 kPa and may be at least 300 kPa. The pressure applied for pressing the continuous layer of a pressure sensitive adhesive onto the component joining surface may be higher than 300 kPa and could even be as high as the contact pressure of the first and second component frictionally joined with the connecting element. Typically, the pressure applied for pressing the continuous layer of the pressure sensitive adhesive onto the component joining surface of the component to be joined is 1 to 5 MPa.

For applying a pressure sensitive adhesive material comprising a plurality of discontinuous islands on the component joining surface of the components to be joined, coating methods such as spray-coating can be used.

The coating methods described above can also be used for coating of the joining surfaces of the connecting element.

After having applied a polymeric material on at least one part of the component joining surface of at least one component, the joining surfaces of the connecting element are brought into close contact with the component joining surfaces of the two components, and the first and second component are mechanically fixed with one another, for example with screws. The hard particles of the joining surfaces of the connecting element are pressed into the component joining surfaces of the two components, thereby frictionally-coupling the two components with the connecting element.

The frictional connection disclosed herein can be used for friction-increasing connection of components to be joined in machine, plant and motor vehicle construction and energy generation. The connecting element disclosed herein can be used for friction-increasing, play-free and/or reversible connection of components to be joined in machine, plant and motor vehicle construction and energy generation.

In principle, the frictional connection disclosed herein can be used in any type of frictional connection throughout the field of mechanical engineering, and in particular, if the forces which can be transmitted by the component surfaces which are imposed by the design are insufficient.

For example, the frictional connection disclosed herein can be used for bolted or clamped connections between parts or components of vehicles, such as subframe and undercarriage, or crankshaft and sprocket, or in camshaft applications, or axle or damper applications, or between parts or components of wind turbines, such as segmented towers or rotor hub and rotor shaft.

The present disclosure will be described in more detail by the following examples.

EXAMPLES

Production of a Connecting Element (as Used for Examples 1 and 2)

For the production of a connecting element, circular steel foils (grade C75S-1.1248 according to DIN EN 10132-4) with a thickness of 0.1 mm and an outer diameter of 30 mm are coated on both joining surfaces by electroless plating with a nickel layer and diamonds with a mean particle size ($d_{50}$) of 25 µm and 35 µm, respectively. As used herein, the ring-shaped steel foils are also referred to as "shims". For electroless nickel plating, the shims are placed on suitable racks and are pretreated in accordance with the general rules of electroless nickel plating by degreasing, pickling and activating. Then, the carrier bearing the shims is immersed in a chemical nickel bath in which diamond powder with a mean particle size ($d_{50}$) of 25 µm or 35 µm, respectively, is dispersed. The quantity of dispersed diamond powder is selected in such a way that under the parameters prevailing in the coating bath (bath movement, deposition rate), the desired proportion of diamond in the deposited layer of nickel is achieved and the nickel layer reaches the desired thickness of up to slightly more than half the diameter of the diamond particles. Under customary process conditions, the immersion time amounts to approximately 15 to 60 minutes.

The carrier comprising the shims which are now electroless nickel plated, is then removed from the chemical nickel bath and is cleaned in an ultrasonic bath, in order to remove diamond particles which are only loosely attached to the nickel layer. The cleaned shims are taken off the carrier and are subject to a heat treatment for 2 hours at a temperature of at least 150° C. This treatment increases the adhesion of the chemical nickel layer to the steel foil and the bonding of the diamonds in the layer itself.

The area percentage of the joining surfaces of the connecting element covered with diamonds is 20%. For the diamonds with a mean particle size ($d_{50}$) of 25 µm, the thickness of the nickel layer, i.e. of the metallic binder layer, is about 13 µm. The average height of the diamonds protruding from the nickel layer is about 12 µm. For the diamonds with a mean particle size ($d_{50}$) of 35 µm, the thickness of the nickel layer, i.e. of the metallic binder layer, is about 17 µm. The average height of the diamonds protruding from the nickel layer is about 18 µm.

Friction Testing

The coefficient of static friction is determined by an experimental set-up in which the friction contact is produced by clamping a center steel block (steel grade S355) with dimensions 14×14×25 mm between two outer steel blocks (steel grade S355; sample 1, sample 2) with larger dimensions (30×30×25 mm) that are pressed by a defined force, representing the normal force, onto the center block. The normal force is generated using a clamping mechanism that is using at least two big screws. The contact pressure for the tests was 50 MPa.

The outer blocks (sample 1, sample 2) are positioned on a stiff and flat base plate. The center block is positioned centrally with respect to the outer blocks. This results in a defined distance of the center block from the base plate.

A shear test is performed by applying a compressive load on the center block from top via a piston. The compressive load is representing the friction force. The test is done using a universal testing machine (Zwick GmbH, Model 1474). The friction force is increased until the center block starts to move relative to the outer blocks (these cannot move since they are positioned on the base plate) in direction towards the base plate. The maximum movement of the center block is set to 500 µm. During the shear test normal force, friction force, and distance of the center block from the base plate are measured continuously.

The measured values of friction force and normal force are used to calculate the coefficient of friction that is defined as the ratio of friction force/normal force. The measured distance of the center block from the base plate is used to calculate the movement of the center block relative to the outer blocks. In this way, the coefficient of friction can be obtained in dependence on the relative movement, representing the friction behavior or the friction curve. This friction curve is used to determine characteristic values as e.g. for defined relative movements or the maximum coefficient of friction which corresponds to the maximum of the friction curve. The coefficient of static friction $\mu_{stat}$ is defined as the coefficient of friction at a relative movement of 20 µm or as the maximum coefficient of friction if the relative movement at the maximum of the friction curve is below 20 µm.

Examples 1 and 2 and Comparative Example

For Examples 1 and 2 and the Comparative Example, friction tests as described above were carried out.

For Examples 1 and 2 and the Comparative Example, the center steel block and the two outer steel blocks (sample 1 and sample 2) were coated on all surfaces by cathodic dip coating with a continuous layer of a lacquer on the basis of epoxy resin (Brillux KTL-EP-Grundierung 5606, commercially available from Brillux GmbH & Co. KG Industrielack, Unna, Germany) for corrosion protection. The thickness of the continuous layer of the polymeric material is 20 µm. The hardness of the continuous layer of the polymeric material is 4H, measured according to DIN EN ISO 15184: 2012.

For Example 1, two circular steel foils (grade C75S-1.1248 according to DIN EN 10132-4) with a thickness of 0.1 mm and an outer diameter of 30 mm are coated on both joining surfaces by electroless plating with a nickel layer and diamonds with a mean particle size ($d_{50}$) of 25 µm, as described above. One of the two circular steel foils coated with a nickel layer and diamonds is positioned between sample 1 and the central block. The second circular steel foil coated with a nickel layer and diamonds is positioned between sample 2 and the central block.

For Example 2, two circular steel foils (grade C75S-1.1248 according to DIN EN 10132-4) with a thickness of 0.1 mm and an outer diameter of 30 mm are coated on both joining surfaces by electroless plating with a nickel layer and diamonds with a mean particle size ($d_{50}$) of 35 µm, as described above. One of the two circular steel foils coated with a nickel layer and diamonds is positioned between sample 1 and the central block. The second circular steel foil coated with a nickel layer and diamonds is positioned between sample 2 and the central block.

For the Comparative Example, for the friction test no connecting elements were positioned between the center block and sample 1 and between the center block and sample 2.

The results of friction testing of Examples 1 and 2 and the Comparative Example are shown in Table 1. The values in Table 1 are the mean values of three experiments carried out in each case.

The friction tests show that a frictional connection as disclosed herein, with the components to be joined being coated with a polymeric material, and a connecting element between the two components to be joined, can have a coefficient of static friction which is higher than for a frictional connection with the components to be joined being coated with a polymeric material, but without a connecting element between the two components to be joined. The friction tests show that the coefficient of static friction can be increased even if the height of the hard particles protruding from the metallic binder layer of the connecting element is lower than the thickness of the layer of the polymeric material.

TABLE 1

| Example No. | Coefficient of static friction $\mu_{stat}$ |
| --- | --- |
| Comparative Example | 0.06 |
| Example 1 | 0.68 |
| Example 2 | 0.84 |

The invention claimed is:

1. A frictional connection comprising a connecting element and two components, the two components being frictionally joined with the connecting element, wherein the connecting element comprises a metal substrate having a first joining surface on one side of the substrate and a second joining surface on an opposite side of the substrate, wherein each joining surface comprises hard particles fixed on the metal substrate by a metallic binder layer, and wherein each of the two components has a bulk material and a component joining surface, and wherein at least one part of the component joining surface of at least one component comprises a continuous layer of a polymeric material selected from the group consisting of polyester materials, acrylic materials, epoxy materials, formaldehyde resins, polyurethane materials, polyvinylacetate (PVAC) materials, polyvinyl butyral (PVB) materials, polyvinyl chloride (PVC) materials, silicone materials, rubber materials and combinations thereof, wherein the hard particles are pressed into the continuous layer of the polymeric material but not into the bulk material of the underlying component to frictionally join the connecting element to the component.

2. The frictional connection of claim 1, wherein the polymeric material is an adhesive material.

3. The frictional connection of claim 1, wherein the polymeric material is a lacquer on the basis of epoxy or acrylic resin coated by cathodic dip coating.

4. The frictional connection of claim 1, wherein the polymeric material is a pressure sensitive adhesive material.

5. The frictional connection of claim 4, wherein the pressure sensitive adhesive material is selected from the group consisting of rubber-based pressure sensitive adhesives, acrylic-based pressure sensitive adhesives and silicone-based pressure sensitive adhesives.

6. The frictional connection of claim 1, wherein the thickness of the continuous layer of the polymeric material is from 1 to 300 µm.

7. The frictional connection of claim 1, wherein at least one part of at least one of the joining surfaces of the connecting element comprises a polymeric material.

8. The frictional connection of claim 1, wherein the bulk material of each of the two components is a metallic material or a fiber reinforced polymer material.

9. The frictional connection of claim 1, wherein at least one part of the component joining surface of each of the two components comprises a continuous layer of the polymeric material, and wherein the hard particles are pressed into the component joining surfaces of the two components, and wherein the hard particles are pressed into the polymeric material, and wherein the hard particles are not pressed into the bulk material of the two components.

10. The frictional connection of claim 1, wherein the hardness of the at least one continuous layer of the polymeric material is at least 3H, when measured according to DIN EN ISO 15184:2012.

11. A process for making a frictional connection according to claim 1, comprising
providing a connecting element, wherein the connecting element comprises a metal substrate having a first joining surface on one side of the substrate and a second joining surface on an opposite side of the substrate, wherein each joining surface comprises hard particles fixed on the metal substrate by a metallic binder layer,
providing two components each of them having a component joining surface,
applying a continuous layer of a polymeric material on at least one part of the component joining surface of each component, and
pressing the hard particles of the joining surfaces of the connecting element into the the continuous layers of polymeric material of the two components but not into a bulk material of the underlying components,
thereby frictionally joining the two components with the connecting element.

* * * * *